(12) United States Patent
Chau

(10) Patent No.: US 10,106,435 B2
(45) Date of Patent: Oct. 23, 2018

(54) FLUID TREATMENT APPARATUS INCLUDING GRANULAR TREATMENT MEDIUM

(71) Applicant: Yiu Chau Chau, Hong Kong (CN)

(72) Inventor: Yiu Chau Chau, Hong Kong (CN)

( * ) Notice: Subject to any disclaimer, the term of this patent is extended or adjusted under 35 U.S.C. 154(b) by 300 days.

(21) Appl. No.: 14/775,423

(22) PCT Filed: Mar. 11, 2013

(86) PCT No.: PCT/CN2013/072408
§ 371 (c)(1),
(2) Date: Sep. 11, 2015

(87) PCT Pub. No.: WO2014/139075
PCT Pub. Date: Sep. 18, 2014

(65) Prior Publication Data
US 2016/0016817 A1    Jan. 21, 2016

(51) Int. Cl.
*B01D 24/16* (2006.01)
*C02F 1/28* (2006.01)
(Continued)

(52) U.S. Cl.
CPC ............ *C02F 1/281* (2013.01); *B01D 24/042* (2013.01); *B01D 24/165* (2013.01);
(Continued)

(58) Field of Classification Search
CPC ...... C02F 1/003; C02F 1/705; C02F 2101/12; C02F 2201/006; C02F 2307/006;
(Continued)

(56) References Cited

U.S. PATENT DOCUMENTS 2,584,394 A * 2/1952 Marvel ................ B01D 36/001
  210/323.2
3,250,704 A * 5/1966 Levendusky .......... B03D 1/016
  210/193

(Continued)

FOREIGN PATENT DOCUMENTS

CN    2301248    12/1998
CN    1604985    4/2005
(Continued)

OTHER PUBLICATIONS

The State Intellectual Property Office of China, "Office Action," issued in connection with Chinese Patent Application No. 201380074315.4, dated Dec. 30, 2016, 6 pages.

(Continued)

*Primary Examiner* — Matthew O Savage
(74) *Attorney, Agent, or Firm* — Hanley, Flight & Zimmerman, LLC

(57) ABSTRACT

A fluid treatment apparatus and a fluid treatment apparatus component include: a treatment chamber (1) having a permeable wall (13), with a fluid outlet section being formed on the permeable wall; the treatment chamber (1) being constructed as: under a working state, the fluid entering the treatment chamber moves at least part of treatment mediums (100) in a direction opposite to the direction in which the treatment mediums tend to move under a non-working state, and the moved treatment mediums are maintained to be a medium bed layer (101) adjoined to the permeable wall.

14 Claims, 10 Drawing Sheets

(51) Int. Cl.
    *B01D 24/46*     (2006.01)
    *B05B 1/18*     (2006.01)
    *B01D 24/04*     (2006.01)
    *B01D 29/01*     (2006.01)
    *B01D 29/11*     (2006.01)
    *C02F 1/42*     (2006.01)
    *C02F 1/00*     (2006.01)
    *B01D 36/02*     (2006.01)
    *C02F 1/70*     (2006.01)
    *C02F 101/12*     (2006.01)

(52) U.S. Cl.
    CPC ......... *B01D 24/4631* (2013.01); *B01D 29/01* (2013.01); *B01D 29/114* (2013.01); *B01D 36/02* (2013.01); *B05B 1/18* (2013.01); *C02F 1/003* (2013.01); *C02F 1/283* (2013.01); *C02F 1/42* (2013.01); *C02F 1/705* (2013.01); *C02F 2101/12* (2013.01); *C02F 2201/006* (2013.01); *C02F 2307/06* (2013.01)

(58) Field of Classification Search
    CPC . C02F 1/283; C02F 1/42; B01D 27/02; B01D 24/10; B01D 24/165; B01D 24/36; B01D 24/4631; B01D 29/66; B01D 29/114; B01D 37/02
    See application file for complete search history.

(56) References Cited

U.S. PATENT DOCUMENTS

| 5,503,742 | A | 4/1996 | Farley |
| 5,944,990 | A | 8/1999 | Edens |
| 6,872,303 | B2 | 3/2005 | Knapp et al. |
| 2003/0116495 | A1 | 6/2003 | Chau |

FOREIGN PATENT DOCUMENTS

| CN | 1871178 | 11/2006 |
| CN | 201558757 | 8/2010 |

OTHER PUBLICATIONS

The State Intellectual Property Office of China, "Search Report," issued in connection with Chinese Patent Application No. 201380074315.4, dated Dec. 30, 2016, 4 pages.

The State Intellectual Property Office of China, "Supplementary Search Report," issued in connection with Chinese Patent Application No. 2013800743154, dated Aug. 22, 2017, 2 pages.

Patent Cooperation Treaty, "International Search Report," issued in connection with PCT Patent Application No. PCT/CN2013/072408, dated Dec. 19, 2013, 7 pages.

Patent Cooperation Treaty, "Written Opinion," issued in connection with PCT Patent Application No. PCT/CN2013/072408, dated Dec. 19, 2013, 13 pages.

\* cited by examiner

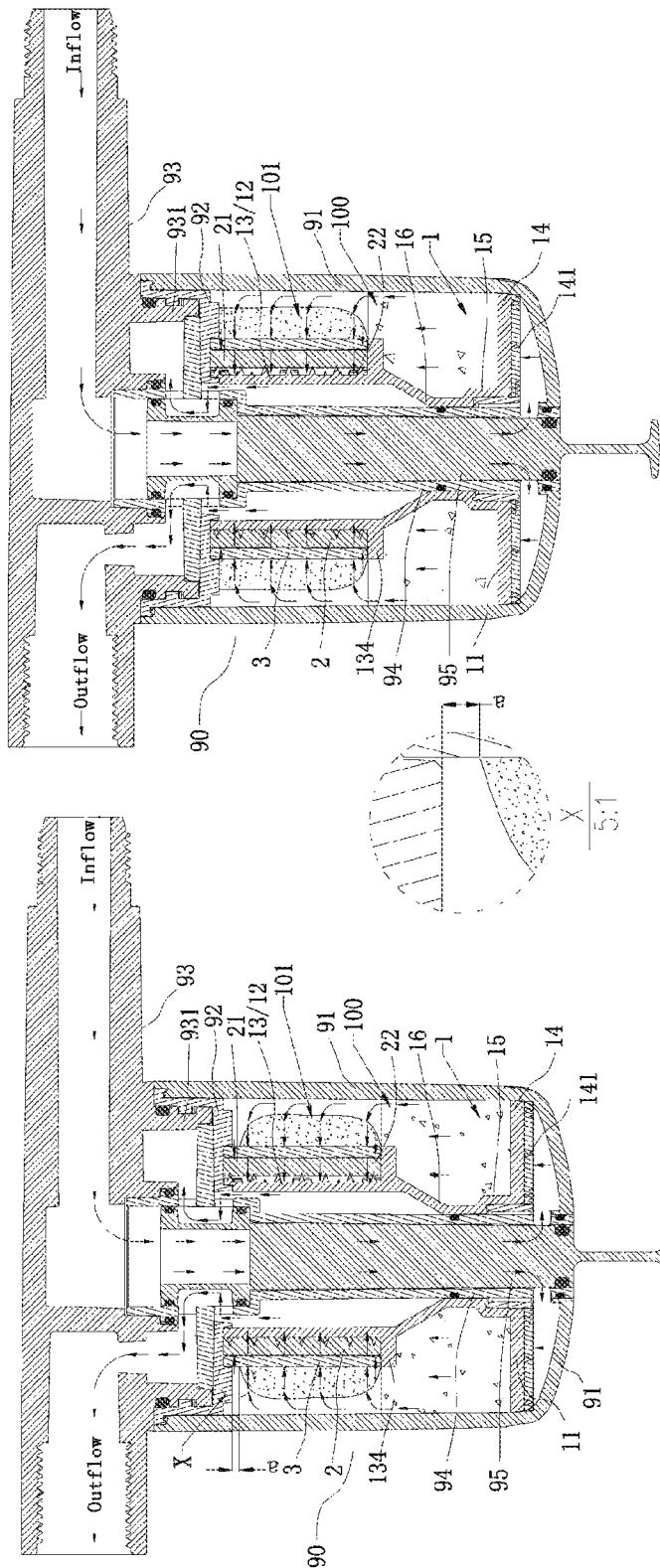

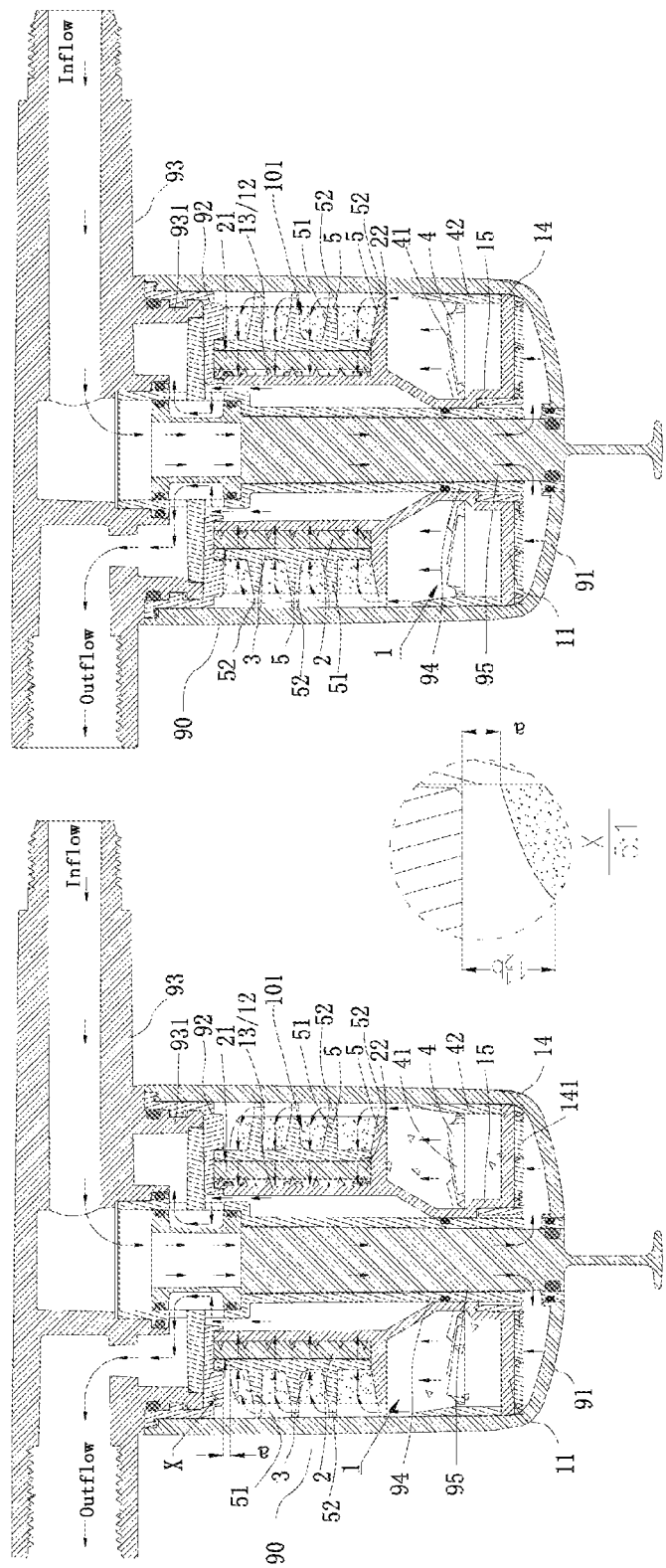

FLUID TREATMENT APPARATUS INCLUDING GRANULAR TREATMENT MEDIUM

FIELD OF THE INVENTION

The present invention relates to a fluid treatment apparatus, and particularly to a fluid treatment apparatus and components of a fluid treatment apparatus using treatment mediums to perform treatment on a fluid.

BACKGROUND OF THE INVENTION

A common fluid treatment apparatus generally uses one or more treatment mediums to perform treatment on various fluids, such as water, ethanol, and the like. When a fluid passes through treatment mediums accommodated in the fluid treatment device, the impurities, pollutant and some components contained therein are removed by physical reaction or chemical reaction with the treatment mediums via contacting therewith. Now, a shower filter, serving as an example of the fluid treatment device, is taken as an example to make explanations.

Referring to FIG. 1, for example, an electric shower heater 901 is generally connected after a shower filter 902 so as to perform treatments, such as chlorine removal, on the water before being supplied to the electric shower heater 901.

In a general design of the fluid treatment device, the fluid passing through the treatment mediums flows, during service, in a direction which tends to compact the treatment mediums. Thus, any dirt or other impurities which are removed by the treatment mediums will be adsorbed in the treatment mediums and accumulate to eventually clog the treatment mediums or deteriorate their treatment performance. Once this situation occurs, the service life of the treatment mediums will be ended and the treatment mediums need to be replaced with new treatment mediums. Thus, the service life of the treatment mediums is short and the usage amount thereof is large.

As the treatment mediums are compacted during service, the resistance to which the incoming water flowing through the treatment mediums is subjected is increased, there is loss in water pressure, and the output water flow decreases. Especially before the treatment mediums having been used for a period of time but having not been replaced, the treatment mediums that adsorb a large amount of dirt will further increase the resistance, the pressure loss increases, and the output water flow decreases. In addition, the dirt contained in the top-down incoming water may be captured on a top of the treatment medium bed which will blind off the medium bed, resulting in huge pressure loss and significant decreasing of the water flow (the water pressure needs to be increased if the same water flow as before needs to be achieved). This case is more prominent in regions with a low water pressure. For example, in Brazil and other regions, many users receive their shower water from a tank that is located on a top of the building. In such a case, a top apartment of the building may only have a head pressure of 1.5 meters (a height of water above the shower pipe). One can imagine in the case of 1.5 meters of water pressure, plus with the resistance imposed by the treatment mediums in the shower filter with dirt gathered therein, the output water flow may be as small as the extent to which a normal shower cannot be performed.

In addition, a minimum water flow as required for use of the shower is 3 liters per minute. In regions with a low water pressure, such as Brazil, the shower filter with the above general fluid treatment design is only able to deal with 4 liters per minute at 4 meters of water pressure at the beginning, the amount of water to be dealt with is small, which is not conducive to use of the shower.

In addition, a United State patent application with a publication No. U.S. Pat. No. 5,503,742 discloses assembly of a shower filter. Referring to FIG. 2, the assembly of shower filter has two separate housing members 903, 904 which are easily taken apart. After being used for a period of time, an internal filter element 905 can be taken out, and reinserted into the housing members 903, 904 after being reversed to perform a backwash operation, so as to prevent the shower filter from being clogged and limiting the flow of water there through. However, such a backwash operation is not only very cumbersome, but also is not effective, because the dirt and impurities that are bonded on the surface of the treatment mediums are not easy to be removed through such a simple backwash operation.

SUMMARY OF THE INVENTION

One technical problem to be solved by the present invention is to provide a fluid treatment apparatus and components of a fluid treatment apparatus, the treatment mediums therein are not easy to be blocked, the service life is significantly extended, the usage amount is significantly reduced, the fluid pressure loss is small, the output water flow is not limited, the amount of fluid to be treated is large, and excellent purifying effects are had.

One technical problem to be solved by the present invention is to provide a fluid treatment apparatus, which is simply used and operated, can simply be switched between a backwash operation mode and a normal working mode, has a very simple backwash operation, can effectively remove the dirt and impurities bonded on the surface of the treatment mediums, and further extends the service life of the treatment mediums.

One technical problem to be solved by the present invention is to provide a fluid treatment apparatus, the fluid almost has no pressure loss, and in the case of extremely low water pressure, the fluid treatment apparatus is still able to provide excellent treatment performance, and is especially suitable for use in ultra-low water pressure regions.

One technical problem to be solved by the present invention is to provide a fluid treatment apparatus, which can use two or more treatment mediums, can perform a pre-treatment before chlorine removal, and significantly increase the chlorine removal performance.

A first aspect of the present invention provides a fluid treatment apparatus, including: a treatment chamber having a fluid inlet section and a fluid outlet section, granular treatment mediums being accommodated in the treatment chamber, wherein the treatment chamber has a permeable wall on which the fluid outlet section is formed; and the treatment chamber is constructed as: under a working state, a fluid entering the treatment chamber from the fluid inlet section moves at least part of the treatment mediums in a direction opposite to the direction in which the treatment mediums tend to move under a non-working state, and these moved treatment mediums are maintained to be a medium bed layer adjoined to the permeable wall.

A first aspect of the present invention also provides components of a fluid treatment apparatus, including a treatment chamber having a fluid inlet section and a fluid outlet section, wherein the treatment chamber has a permeable wall on which the fluid outlet section is formed; the treatment chamber is constructed as: under a working state, a fluid entering the treatment chamber from the fluid inlet section moves at least part of treatment mediums accommodated in the treatment chamber in a direction opposite to the direction in which the treatment mediums tend to move under a non-working state, and these moved treatment mediums are maintained to be a medium bed layer adjoined to the permeable wall.

According to the above fluid treatment apparatus and its components, the following beneficial technical effects can be obtained, and a notable progress is had.

In the present invention, the fluid moves the treatment mediums in a direction of not compacting the treatment mediums, i.e., in a direction that makes the treatment mediums boil or allow occurrence of turbulent. The treatment mediums are in a loose state, and any dirt or impurity is not easy to seal or block the treatment mediums. The treatment mediums have a long service life, and as there is no need to frequently replace them with new treatment mediums, the usage amount of the treatment mediums is significantly reduced. Moreover, the treatment mediums being maintained to be a medium bed layer that is relatively dense compared to a complete loose state can effectively improve the treatment performance.

Moreover, the treatment mediums have sufficient clearance therebetween to allow the fluid to pass through, the situations that the treatment mediums are sealed or blocked will not occur, thus the resistance to which the fluid is subjected is very small, the pressure loss of the fluid before and after treatment of the fluid is small, it will not make the water flow decrease, and they are especially suitable for use by users with a low water pressure.

Moreover, during the process of the treatment mediums being moved and maintained to be a medium bed layer, mutual friction and collision between surfaces of the treatment mediums will occur, thus consolidation of dirt and impurities on the surfaces of the treatment mediums is not easy to occur. Even if the dirt and impurities are adhered to the surface of the treatment mediums, there is also a tendency to be easily removed.

Moreover, the treatment mediums will completely not clog the flow of the fluid, and the amount of fluid to be treated is large.

Finished product manufacturers can buy the components of fluid treatment apparatus of the present invention serving as a semi-finished product, and add predetermined treatment mediums therein upon production needs, and assemble to be a fluid treatment apparatus serving as a finished product, along with other necessary components, thereby providing more choice and flexibility while being able to achieve the above effect.

A second aspect of the present invention provides a fluid treatment apparatus, including a treatment chamber, the treatment chamber having a fluid inlet section and a fluid outlet section, granular treatment mediums being accommodated in the treatment chamber, the treatment mediums being not full fill with the treatment chamber, wherein:

the treatment chamber has a permeable wall on which the fluid outlet section is formed, and a barrel-shaped filter is provided at an outer periphery of the permeable wall;

one or more bed depth control plates distributed at intervals in a height direction are provided at an outer side of the barrel-shaped filter, and flow control fingers are provided on the bed depth control plates;

a bed depth control flange and a flow control flange are provided at a radial outer side of a top of the barrel-shaped filter, and the bed depth control flange and the flow control flange extend downwards, and the flow control flange is located at a radial outer side of the bed depth control flange; and the treatment chamber is constructed as: under a working state, a fluid entering the treatment chamber from the fluid inlet section moves at least part of the treatment mediums upwards, and these moved treatment mediums are maintained to be a medium bed layer surrounding the barrel-shaped filter.

On the premise of being able to achieve the effects of the fluid treatment apparatus according to the first aspect of the present invention, the fluid treatment apparatus according to the second aspect of the present invention increases a velocity of the fluid by decreasing a cross-sectional area of a fluid passage through the flow control fingers and the flow control flange, and meanwhile forms a relatively thick medium bed layer in the entire axial length of the barrel-shaped filter through the bed depth control plates and the bed depth control flange, resulting in its treatment performance being improved significantly; and bears the treatment mediums by the bed depth control plates, thus the pressure of the fluid for suspending and holding the treatment mediums is slashed, and the fluid almost has no pressure loss. Thus, the second aspect of the present invention obtains a fluid treatment apparatus with an ultra-low pressure loss, and is especially suitable for use by users in ultra-low-pressure regions such as Brazil.

A third aspect of the present invention provides a fluid treatment apparatus, including a treatment chamber having a fluid inlet section and a fluid outlet section, granular treatment mediums being accommodated in the treatment chamber, the treatment mediums being not full fill with the treatment chamber, wherein:

the treatment chamber has a permeable wall on which the fluid outlet section is formed, and a barrel-shaped filter is provided at an outer periphery of the permeable wall;

one or more bed depth control plates distributed at intervals in a height direction are provided at an outer side of the barrel-shaped filter; and the treatment chamber is constructed as: under a working state, a fluid entering the treatment chamber from the fluid inlet section moves at least part of the treatment mediums upwards, and these moved treatment mediums are maintained to be a medium bed layer surrounding the barrel-shaped filter.

A fourth aspect of the present invention provides a fluid treatment apparatus, including a treatment chamber having a fluid inlet section and a fluid outlet section, granular treatment mediums being accommodated in the treatment chamber, the treatment mediums being not full fill with the treatment chamber, wherein:

the treatment chamber has a permeable wall on which the fluid outlet section is formed, and a barrel-shaped filter is provided at an outer periphery of the permeable wall;

a flow control member is provided in the treatment chamber, and the flow control member increases a velocity of a fluid by reducing a cross-sectional area of a flow passage, and the treatment chamber is constructed as: under a working state, the fluid entering the treatment chamber from the fluid inlet section moves at least part of the treatment mediums upwards, and these moved treatment mediums are maintained to be a medium bed layer surrounding the barrel-shaped filter.

On the premise of being able to achieve the effects of the fluid treatment apparatus according to the first aspect of the present invention, the fluid treatment apparatus according to the third and fourth aspects of the present invention further reduces the pressure loss.

A fifth aspect of the present invention provides a fluid treatment apparatus, including an enclosure and a treatment chamber provided in the enclosure, granular treatment mediums being accommodated in the treatment chamber, wherein:

a backwash discharge port is provided at a bottom of the enclosure, the treatment chamber has a fluid inlet section and a fluid outlet section, the treatment chamber has a permeable wall on which the fluid outlet section is formed, and a barrel-shaped filter is provided at an outer periphery of the permeable wall;

the treatment chamber is constructed as: under a working state, a fluid entering the treatment chamber from the fluid inlet section moves at least part of the treatment mediums upwards, and these moved treatment mediums are maintained to be a medium bed layer surrounding the barrel-shaped filter; and a central sleeve is provided at a radial inner side of the treatment chamber, a core member is provided in the central sleeve, a portion of the core member passing through the backwash discharge port and protruding below the enclosure forms an operating portion, the core member is able to move up and down between a working position and a backwash position, at the working position, the core member is located at a lower position and closes the backwash discharge port, and at the backwash position, the core member is pushed up to an upper position, and the backwash discharge port is opened.

On the premise of being able to achieve the effects of the fluid treatment apparatus according to the first aspect of the present invention, the fluid treatment apparatus according to the fifth aspect of the present invention can switch between a working state and a backwash state by simply pushing and pulling the core member, and the backwash operation is particularly simple and efficient. Moreover, the fluid treatment apparatus according to the present invention can effectively clean the treatment mediums by such a backwash operation, the service life of the treatment mediums is further extended, and the usage amount of the treatment mediums is reduced to a minimum.

A sixth aspect of the present invention provides a fluid treatment apparatus, wherein the fluid treatment apparatus comprises a treatment chamber and a pre-treatment chamber;

the treatment chamber has a fluid inlet section and a fluid outlet section, granular treatment mediums are accommodated in the treatment chamber, and the treatment mediums are not full fill with the treatment chamber;

the pre-treatment chamber is located on an upstream side within the treatment chamber or located on the upstream side of an external of the treatment chamber, pre-treatment mediums are accommodated in the pre-treatment chamber to perform a pre-treatment on a fluid;

the treatment chamber has a permeable wall on which the fluid outlet section is formed, and a barrel-shaped filter is provided at an outer periphery of the permeable wall;

the treatment chamber is constructed as: under a working state, the fluid entering the treatment chamber from the fluid inlet section moves at least part of the treatment mediums upwards, and these moved treatment mediums are maintained to be a medium bed layer surrounding the barrel-shaped filter.

A seventh aspect of the present invention provides a fluid treatment apparatus, including a treatment chamber, having a fluid inlet section and a fluid outlet section, copper and zinc particles are accommodated in the treatment chamber; the treatment chamber has a permeable wall on which the fluid outlet section is formed, wherein:

the treatment chamber is constructed as: under a working state, a fluid entering the treatment chamber from the fluid inlet section moves at least part of the treatment mediums upwards, and these moved treatment mediums are maintained to be a medium bed layer surrounding the permeable wall, and a chemical property of the fluid is changed to increase the performance of chlorine removal by the copper and zinc particles, by placing either calcium sulphite or nanocrystalline polymers at an upstream side of the copper and zinc particles.

On the premise of being able to achieve the effects of the fluid treatment apparatus according to the first aspect of the present invention, the fluid treatment apparatus according to the sixth and seventh aspects of the present invention can also use two or more kinds of treatment mediums, can perform a pre-treatment on the fluid through a pre-treatment medium, thereby significantly improving the treatment performance of the treatment mediums.

BRIEF DESCRIPTION OF THE DRAWINGS

FIGS. 4A-4C are schematic views of respective embodiments of Implementation Way 2 of the present invention;

FIGS. 5A-5C are schematic views of respective embodiments of Implementation Way 3 of the present invention;

DETAILED DESCRIPTION OF THE EMBODIMENTS

The present invention provides a fluid treatment apparatus and components of a fluid treatment apparatus. The fluid treatment apparatus component is a constituent part of the fluid treatment apparatus. In order to make the application documents be more concise, the present invention will be described in the form of describing various embodiments of the fluid treatment apparatus. Various embodiments of the fluid treatment apparatus component have all been included in the various embodiments of the fluid treatment apparatus, and are not described alone.

Further, the present invention will describe main relevant components, the parts that are the same as that in the prior art are not described in detail any more.

In addition, the fluid treatment apparatus and the components thereof in the present invention can be used to perform a treatment on the shower water, but apparently it is not limited to this, it can also be used to perform a treatment on drinking water, industrial water, etc. It is appreciated that obviously, the fluid treatment apparatus and the component thereof in the present invention may also be used to perform a treatment on other fluids.

Implementation Way 1

Figure 1:
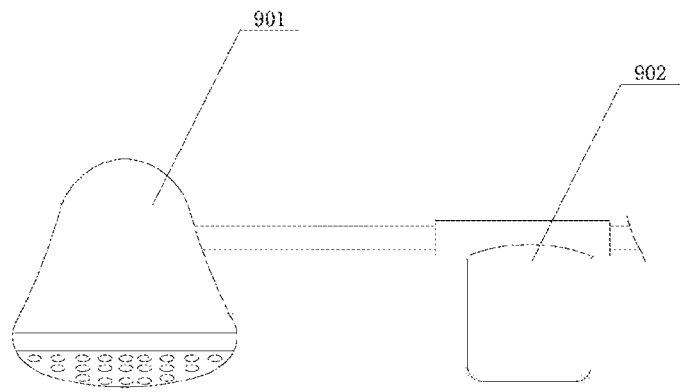
FIG. 1 is a schematic view of use of a shower filter in the prior art.
Figure 2:
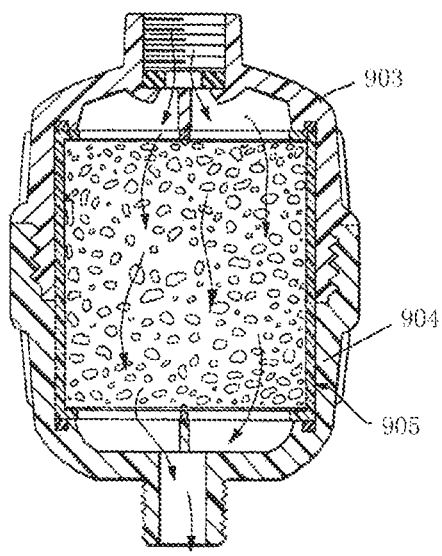
FIG. 2 is a schematic view of a structure in the prior art.
Figures 3A, 3B, 3C:
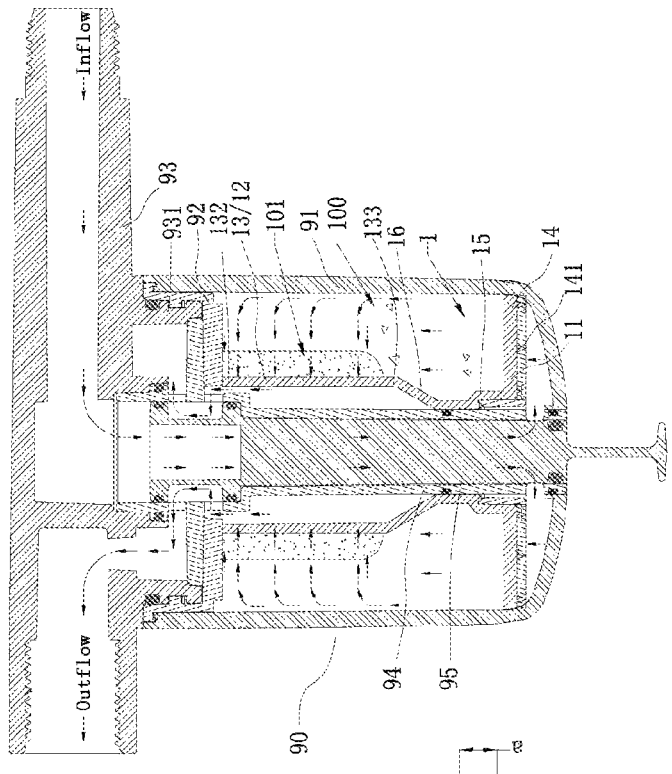
FIGS. 3A-3G are schematic views of respective embodiments of Implementation Way 1 of the present invention.

As illustrated in FIGS. 3A-3C, the present invention provides a fluid treatment device including a treatment chamber 1. The treatment chamber 1 has a fluid inlet section 11 and a fluid outlet section 12. Granular treatment mediums 100 are accommodated in the treatment chamber 1. The treatment mediums 100 may be not full fill with the treatment chamber 1. The treatment mediums 100 are, e.g., activated carbon particles, ion exchange resin particles, or copper and zinc alloy particles (KDF-55, KDF-85), etc. In the present invention, KDF with a density of 8 is taken as an example to make illustrations. Of course, the treatment mediums 100 with other density may also be selected. The treatment chamber 1 has a permeable wall 13 on which the fluid outlet section 12 is formed. In one embodiment, the permeable wall 13 is barrel-shaped, preferably cylindrical, however, the barrel shape with a regular cross-section, such as being triangular, square, pentagonal, or polygonal, or irregular cross-section can also be used. The improvement of the present invention is that the treatment chamber 1 is constructed as: under a working state, a fluid entering the treatment chamber 1 from the fluid inlet section 11 moves at least part of the treatment mediums 100 in a direction opposite to the direction in which the treatment mediums 100 tend to move under a non-working state, and these moved treatment mediums 100 are maintained to be a medium bed layer 101 adjoined to the permeable wall 13.

In the present invention, the fluid moves the treatment mediums 100 in a direction of not compacting the treatment mediums 100, i.e., in a direction that makes the treatment mediums 100 boil or allow occurrence of turbulent. The treatment mediums 100 are in a loose state, and any dirt or impurity is not easy to seal or block the treatment mediums 100. The treatment mediums 100 have a long service life, and as there is no need to frequently replace them with new treatment mediums 100, the usage amount of the treatment mediums 100 is significantly reduced. Compared to the treatment mediums 100 being in a particle monomeric state in which the treatment mediums 100 are lonely loose, and are independent of each other, the treatment mediums 100 being maintained to be the medium bed layer 101 that is relatively dense compared to the complete loose state can effectively improve the treatment performance.

The treatment mediums 100 have sufficient clearance therebetween to allow the fluid to pass through, the situations that the treatment mediums 100 are sealed or blocked will not occur, thus the resistance to which the fluid is subjected is very small, the pressure loss of the fluid before and after treatment of the fluid is small, it will not make the water flow decrease, and they are especially suitable for being used by users with a low water pressure.

During the process of the treatment mediums 100 are moved and maintained to be the medium bed layer 101, mutual friction and collision between surfaces of the treatment mediums 100 will occur, thus consolidation of dirt and impurities on the surfaces of the treatment mediums 100 is not easy to occur. Even if the dirt and impurities are adhered to the surface of the treatment mediums 100, there is also a tendency to be easily removed.

The treatment mediums 100 will completely not clog the flow of the fluid, the amount of fluid to be treated is large, and it is also suitable for use even for a shower with a very small minimum rated flow.

In order to achieve that the fluid entering the treatment chamber 1 from the fluid inlet section 11 moves at least part of the treatment mediums 100 in a direction opposite to the direction in which the treatment mediums 100 tend to move under the non-working state, in one embodiment, under the non-working state, the treatment mediums 100 have a moving direction that tends to move downwards due to gravity action; and under the working state, the fluid entering the treatment chamber 1 from the fluid inlet section 11 moves at least part of the treatment mediums 100 upwards, and these moved treatment mediums 100 are maintained to be the medium bed layer 101 at a top of the treatment chamber 1. The present embodiment utilizes cooperation of the gravity of the treatment mediums 100 per se with the impact force of the fluid on the treatment mediums 100, to achieve the operating principle of not compacting the treatment mediums 100. In another embodiment, under the non-working state, the treatment mediums 100 have a movement direction that tends to move upwards due to, e.g., being subjected to a suction of a suction device located above the treatment mediums 100 or the like; and under the working state, the fluid entering the treatment chamber 1 from the fluid inlet section 11 moves at least part of the treatment mediums 100 downwards, and these moved treatment mediums are maintained to be a medium bed layer at a bottom of the treatment chamber. This embodiment also can achieve the operating principle of not compacting the treatment mediums, but a force applying unit that makes the treatment mediums 100 have a tendency to move upwards under a non-working state needs to be configured. Although such a structure would lead to a complex mechanism, in the case of the installation space is limited and cannot be improved, this embodiment also provides a beneficial choice.

Many ways can be used to achieve the function of maintaining those moved treatment mediums 100 to be the medium bed layer 101 adjoined to the permeable wall 13. Several examples are provided as follows. However, the present invention is not limited thereto.

In one embodiment, such a function can be achieved by a construction of the treatment chamber 1. For example, as illustrated in FIG. 3A, the treatment chamber 1 has a bottom 14, a support ring wall 15 connected to the bottom 14, and a tapered ring wall 16 connected to the support ring wall 15, the tapered ring wall 16 being connected to the permeable wall 13, the tapered ring wall 16 is gradually expanded along an upward direction, and the fluid inlet section 11 is provided at the bottom 14. The fluid inlet section 11 includes a plurality of inflow openings 111 (see FIG. 9A), the inflow openings 111 each are arc-shaped, the plurality of inflow openings 111 are concentrically arranged on the bottom 14 to be a multilayer ring. By the relatively regular arrangement manner of the respective inflow openings 111, it is conducive to formation of a slow or laminar flow of the fluid, in combination with the guiding role of the tapered ring wall 16, it can make the moved treatment mediums 100 gather upwards and build the medium bed layer 101 with a certain thickness. The thickness of the medium bed layer 101 increases with the usage amount of the treatment 30 mediums 100. In a preferred embodiment, a pre-filter 141 is provided at a lower surface (i.e., an upstream side) of the bottom 14.

Figure 3G:
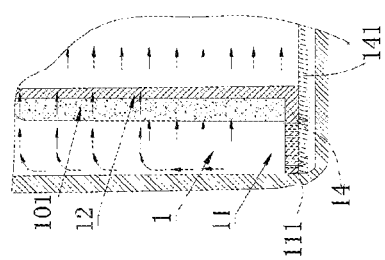
Figure 3F:
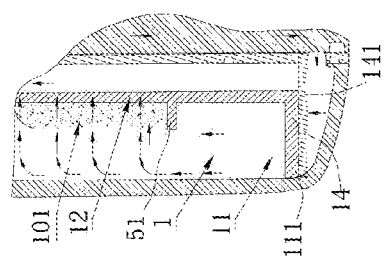
Figure 3E:
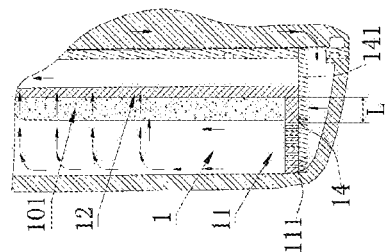
Figure 3D:
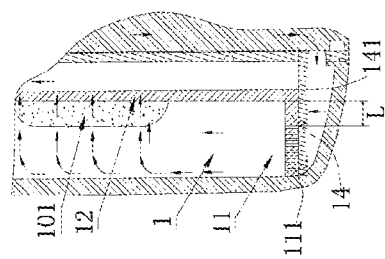

In another embodiment, referring to FIGS. 3D and 3E, the treatment chamber 1 may not include the support ring wall 15 and the tapered ring wall 16, but only includes the permeable wall 13. In this case, the medium bed layer 101 is obtained through a distance difference in a radial direction between the fluid inlet section 11 and the permeable wall 13. Specifically, it is to make that there is a predetermined distance L between the inflow openings 111 of the fluid inlet section 11 in an innermost ring and an outer wall surface of the permeable wall 13, and the predetermined distance L is corresponding to a thickness of the medium bed layer 101. In order to express it more clearly, the applicant makes an exaggerated drawing of the inflow openings 111. Referring to FIG. 3D, the permeable wall 13 may only be distributed on an upper portion of the treatment chamber 1. Referring to FIG. 3E, the permeable wall 13 may also be distributed over the entire height of the treatment chamber 1. Through the distribution characteristics of the inflow openings 111, the medium bed layer 101 can be formed on the upper portion or over the entire height of the treatment chamber 1. When the permeable wall 13 is distributed over the entire height of the treatment chamber 1, the lowermost thickness of the medium bed layer 101 would not be affected by the fluid flushing action.

In another embodiment, referring to FIG. 3F, the medium bed layer 101 can also be obtained by forming radially outwardly extending bed depth control plates 51 that can play the role of bearing the treatment mediums 100, on the permeable wall 13. Apparently, the bed depth control plates 51 may be formed integrally with the permeable wall 13, and separate bed depth control plates 51 can also be used to be assembled onto the permeable wall 13. The embodiment with the bed depth control plates 51 can avoid the situation that the lowermost thickness of the medium bed layer 101 is smaller.

Several examples of obtaining the medium bed layer 101 are given above. Of course, the present invention is not limited thereto. A person skilled in the art may use any way to obtain the medium bed layer, such as by design of the flow passage, external addition of a limitation member, external addition of a force applying unit, or the like, it is not described in detail herein.

In various embodiments above, a passage for outflow of the treated fluid is formed on a radial inner side of the treatment chamber 1, i.e., the permeable wall 13 is located at a radial inner ring of the treatment chamber 1, i.e., the fluid works in the direction of flowing from an outer ring to an inner ring as illustrated in FIG. 3A (see arrows). Thus, the medium bed layer 101 surrounds a radial outer side of the permeable wall 13. In order to facilitate the formation of the medium bed layer, a plurality of projections (see FIG. 4A) may be provided on an outer circumferential surface of the permeable wall 13.

Of course, if the passage for outflow of the treated fluid is formed on a radial outer side of the treatment chamber 1, i.e., the permeable wall is located on a radial outer periphery of the treatment chamber, in the opposite direction of the arrow direction shown in FIG. 3A or FIG. 3C, the fluid works in accordance with the direction of flowing from the inner ring to the outer ring. In this case, the medium bed layer 101 will be distributed on a radial inner side of the permeable wall. This way provides a choice, and a person skilled in the art can make the corresponding flow passage design according to the flowing mode, it is not described in detail herein.

Of course, in another feasible embodiment, referring to FIG. 3G the treatment chamber 1 and the outflow passage of the treated fluid are located on both sides, for example, the treatment chamber 1 is on the left side, the outflow passage of the treated fluid is on the right side, i.e., the permeable wall 13 is plate-shaped, herein, the medium bed layer 101 will be distributed on the side of the permeable wall 13.

In the present invention, the specific shape and the distribution location of the medium bed layer 101 are not limited, as long as a relatively dense dielectric layer having a certain thickness is formed relative to the fully dispersed and separate treatment medium particles, the object of the present invention can be achieved.

Further, the other major constituent members of the fluid treatment apparatus of the present invention are briefly described as follows. The same parts as that in the prior art will be described simply. The fluid treatment apparatus further includes:

an enclosure 91, serving as an outer casing of the whole fluid treatment apparatus;

a top cover 92;

the enclosure 91, the top cover 92 and the aforementioned bottom 14, the support ring wall 15, the tapered ring wall 16 and the permeable wall 13 and the like together defining the treatment chamber 1, and also constituting an apparatus body 90, of course, this is merely an example, the structure of the present invention is not limited thereto;

a connecting pipe portion 93, for communicating with a water pipeline of a fluid apparatus such as an electric shower heater, the connecting pipe portion 93 serving as a passage for inflow of the fluid to be treated and outflow of the treated fluid, the connecting pipe portion 93 including a connecting portion 931 engaging with the apparatus body 90, the connecting portion 931 may be engaged with the apparatus body 90 by any manner, such as ultrasonic welding, threaded connection, and the like;

a central sleeve 94 and a core member 95 disposed therein, the central sleeve 94, the core member 95, the treatment chamber 1 and the connecting pipe portion 93 together defining a fluid passage. Of course, in the case of no backwash structure is provided, the central sleeve 94 and the core member 95 disposed therein may be combined.

Of course, the above structure is merely an example of the present invention.

The working process of the fluid treatment apparatus according to the present Implementation Way will be introduced as follows.

Referring to FIG. 3A, when the fluid has a low flow rate (typically 2 to 4 liters per minute): nearly half of the treatment mediums (e.g., KDF) 100 are moved up and the treatment mediums uniformly surround the permeable wall 13, except a top portion 132 and a bottom portion 133 of the permeable wall 13, to form the medium bed layer 101.

The remaining half of the treatment mediums 100 will be violently impacted at a lower portion of the treatment chamber 1 to be moved fast.

The KDF is able to effectively remove free chlorine in the fluid.

Referring to FIG. 3B, there is no medium bed layer 101 formed by the treatment mediums 100 in the area with a length of a, to which the arrow X points, at the top portion 132 of the permeable 10 wall 13, because the fluid speed is too low, the treatment mediums 100 cannot be lifted to the top portion 132. At the top portion 132, as there is no medium bed layer 101 to surround, the fluid passing through this portion is not subjected to chlorine removal treatment.

Referring to FIG. 3A, at the bottom portion 133 of the permeable wall 13, due to the flushing action of the fluid, the thickness of the medium bed layer 101 is relatively thin, and the fluid passes through this portion with poor removal of chlorine.

The medium bed layer 101 has a uniform thickness at an intermediate portion of the permeable wall 13 except the top portion 132 and the bottom portion 133, and the fluid passes through this portion with fully removal of chlorine.

The horizontal up flow design of the present invention enables the treatment mediums 100 to build outside the permeable wall 13 to temporarily form the medium bed layer 101, and then the fluid passes through the medium bed layer 101.

The treatment mediums 100 are uniformly distributed around the permeable wall 13, theoretically, the fluid passing through this portion will pass through the same medium bed depth thickness. Of course, the thickness of the medium bed layer 101 increases with the usage amount of the treatment mediums 100.

Referring to FIG. 3C, when the fluid has a high flow rate (typically 4 to 10 liters per minute), most of the treatment mediums are lifted up due to the high flow rate, and uniformly distributed around the permeable wall 13.

Only a small quantity of the treatment mediums are violently impacted at the lower portion of the treatment chamber 1 to be moved fast.

At the top portion 132 of the permeable wall 13, there are enough treatment mediums 100, thus the thickness of the medium bed layer 101 herein is consistent with that of the intermediate portion, and the fluid passes through the top portion 132 with fully removal of chlorine.

At the bottom portion 133 of the permeable wall 13, the medium bed layer 101 with a relatively thin thickness is still formed due to the flushing action of the fluid, and the fluid passes through this portion with poor removal of chlorine.
Implementation Way 2

Referring to FIGS. 4A-4C, the structure, the working principle and the effect of the present Implementation Way are basically the same as that of the Implementation Way 1, and the same parts are not repeated any more. The differences therebetween are: a barrel-shaped filter 2 is provided at an outer periphery of the permeable wall 13, the medium bed layer 101 will surround the barrel-shaped filter 2, and the fluid sequentially passes through the medium bed layer 101, the barrel-shaped filter 2 and the permeable wall 13 to flow out from the treatment chamber 1.

The shape of the cross section of the barrel-shaped filter 2 should be corresponding to that of the barrel-shaped permeable wall 13. In the preferred embedment in which the permeable wall 13 is cylindrical, the barrel-shaped filter 2 is also a cylindrical filter, and this is conducive to the treatment mediums 100 being uniformly distributed in a circumferential direction. The barrel-shaped filter 2 can be disposed outside of the permeable wall 13 in any way.

Figure 9A:
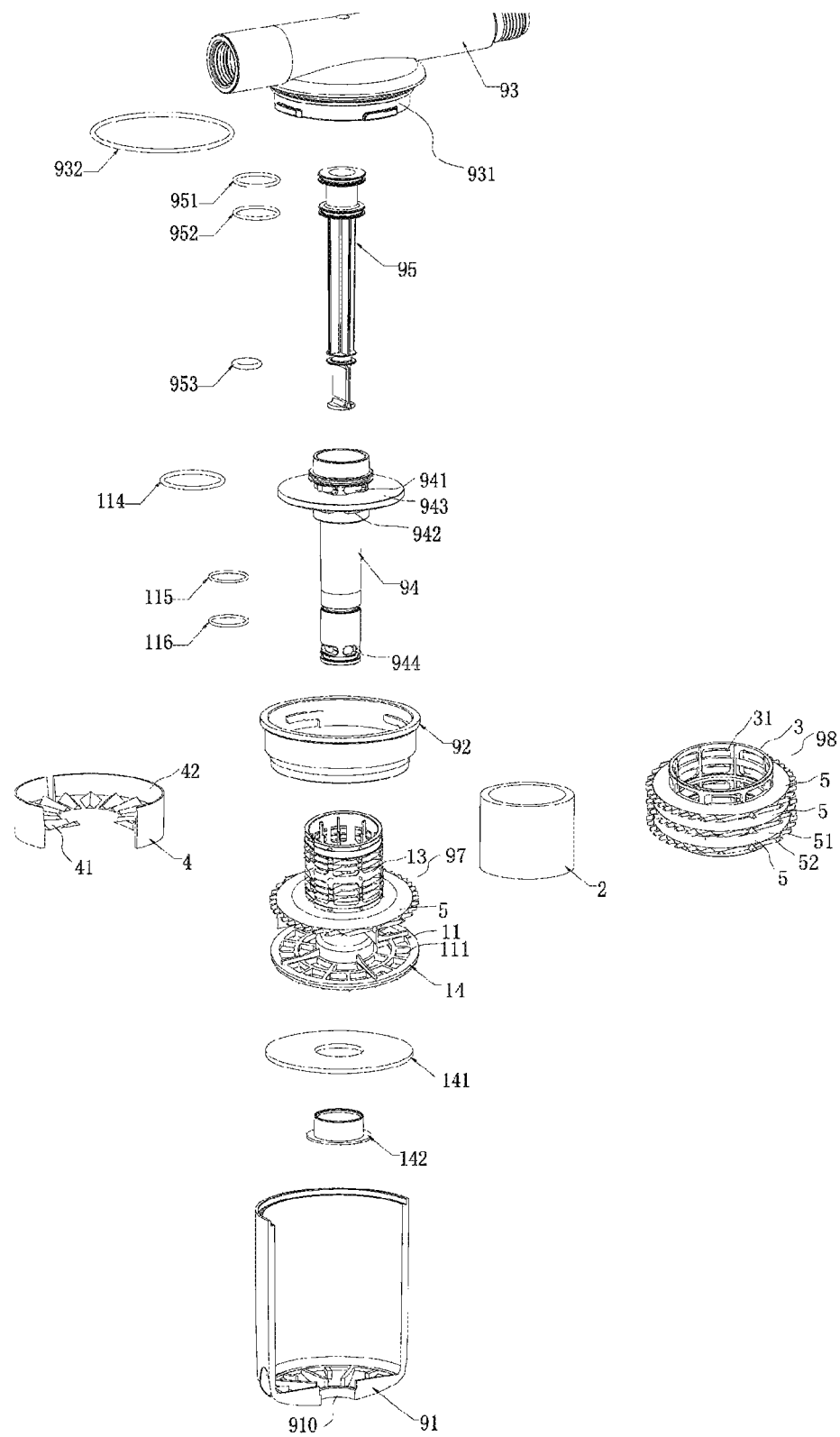
FIGS. 9A-9E are exploded schematic views and partial assembly views of the fluid treatment device according to Implementation Ways 3-6 of the present invention.
Figure 9E:
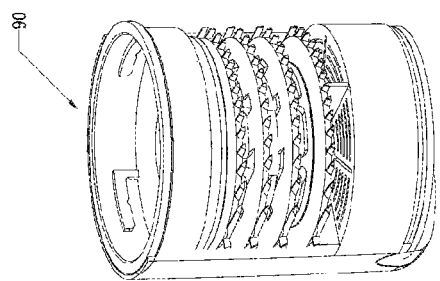
Figure 9D:
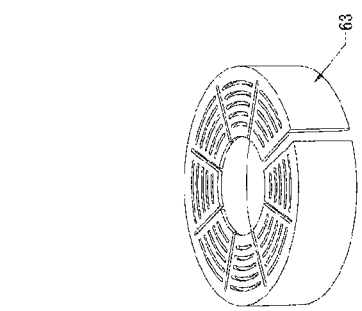
Figure 9C:
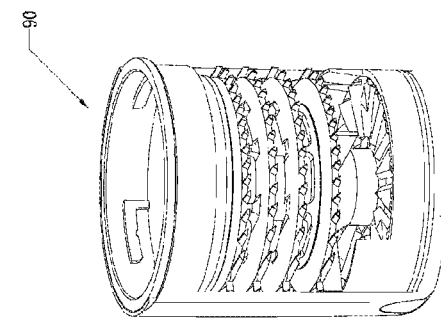
Figure 9B:
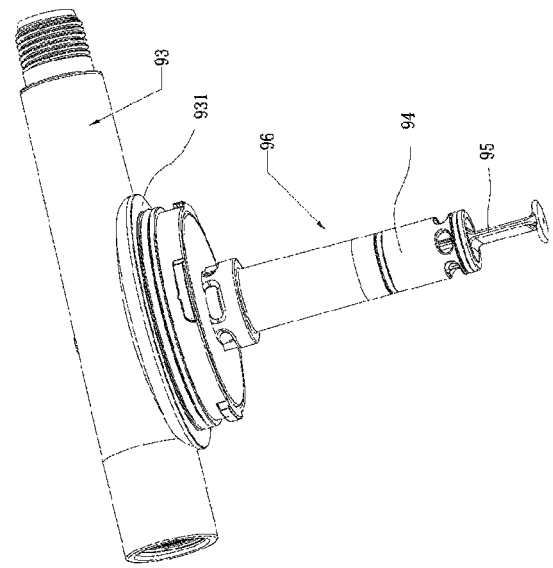

In one embodiment, referring also to FIG. 9A, a holding member 3 may also be provided at a periphery of the barrel-shaped filter 2, and the holding member 3 is able to hold the barrel-shaped filter 2 and the medium bed layer 101. The holding member 3 has a holding body, on which a plurality of through holes 31 are formed, and the plurality of through holes 31 are arranged into a plurality of columns in an up and down direction, and the plurality of columns are distributed along a circumferential direction of the holding body. The holding member 3 on the one hand can be used to hold the barrel-shaped filter 2 on the permeable wall 13, and on the other hand can also be used to facilitate the construction of the medium bed layer 101. Obviously, the holding member 3 may be omitted.

In the present embodiment, an annular flange 134 extending radially and outwardly is provided at a junction of the permeable wall 13 and the tapered ring wall 16. When the length of the annular flange 134 extending radially does not exceed an outer surface of the barrel-shaped filter 2, the annular flange 134 can only be used as a mounting base of the barrel-shaped filter 2 (and the holding member 3), the bottoms of the barrel-shaped filter 2 (and the holding member 3) may be placed on an upper surface of the annular flange 34, the tops of the barrel-shaped filter 2 (and the holding member 3) can engage with the top cover 92, and the barrel-shaped filter 2 (and the holding member 3) can be effectively installed and fixed through the annular flange 34 and the top cover 92.

When the length of the annular flange 134 extending radially does not exceed the outer surface of the barrel-shaped filter 2 by a predetermined length, the annular flange 134 can also play the role of controlling a bed depth of the medium bed layer 101, and herein it is equivalent to the bed depth control plates 51 described later in the Implementation Way 3. Of course, the annular flange 134 may be omitted entirely. The barrel-shaped filter 2 and the holding member 3 can absolutely be installed by engagement with the lower surface of the top cover 92 via welding, buckling, and the like, without the annular flange 134 serving as the base.

The working process of the fluid treatment apparatus according to the present Implementation Way will be introduced as follows.

Referring to FIG. 4A, when the fluid has a low flow rate (typically 2 to 4 liters per minute): nearly half of the treatment mediums (e.g., KDF) 100 are moved up, and the treatment mediums 100 uniformly surround the barrel-shaped filter 2, except a top 21 and a bottom 22 of the barrel-shaped filter 2, to form the medium bed layer 101.

The remaining half of the treatment mediums are violently impacted at the lower portion of the treatment chamber 1 to be moved fast.

Referring to FIG. 4B, there is no medium bed layer 101 formed by the treatment mediums 100 in the part with a length of a in the area to which the arrow X points, at the top 21 of the barrel-shaped filter 2, because the fluid speed is too low, the treatment mediums 100 cannot be lifted to the top 21. At the top 21, as there is no medium bed layer 101 to surround, the fluid passing through this portion is not subjected to chlorine removal treatment.

Referring to FIG. 4A, at the bottom 22 of the barrel-shaped filter 2, due to the flushing action of the fluid, the thickness of the medium bed layer 101 is relatively thin, and the fluid passes through this portion with poor removal of chlorine.

The medium bed layer 101 has a uniform thickness at the remaining portion of the barrel-shaped filter 2 except the top 21 and the bottom 22, and the fluid passes through this portion with fully removal of chlorine.

Referring to FIG. 4C, when the fluid has a high flow rate (typically 4 to 10 liters per minute), most of the treatment mediums are lifted up due to the high flow rate, and uniformly distributed around the barrel-shaped filter 2.

Only a small quantity of the treatment mediums are violently impacted at the lower portion of the treatment chamber 1 to be moved fast.

At the top 21 of the barrel-shaped filter 2, there are enough treatment mediums 100, thus the thickness of the medium bed layer 101 here is consistent with that of an intermediate portion, and the fluid passes through the top 21 with fully removal of chlorine.

At the bottom 22 of the barrel-shaped filter 2, the medium bed layer 101 with a relatively thin thickness is still formed due to the flushing action of the fluid, and the fluid passes through this portion with poor removal of chlorine.

Implementation Way 3

Referring to FIGS. 5A-5C, the structure, the working principle and the effect of the present Implementation Way are basically the same as that of the Implementation Ways 1 and 2, and the same parts are not repeated any more. The differences therebetween are: on the basis of the Implementation Ways 1 and 2, a flow control member 4 is provided inside the treatment chamber 1. The flow control member 4 increases a velocity of the fluid by decreasing a cross-sectional area of a fluid passage, or a bed depth control member 5 is provided to reduce the pressure loss of the fluid for suspending and holding the treatment mediums 100 around the barrel-shaped filter 2.

The flow control member 4 can be provided at any position inside the treatment chamber 1. Of course, in one embodiment, the flow control member 4 may also be provided at any position on an upstream side of an external of the treatment chamber 1, so that the fluid is accelerated before entering the treatment chamber.

In one embodiment, as illustrated in FIG. 5A, the flow control member 4 is located below the medium bed layer 101 (or the barrel-shaped filter 2) in the treatment chamber 1, there are one or more flow control members 4. When there are two or more flow control members 4, the flow control members 4 should be sequentially arranged from top to bottom.

In the present invention, the flow control members 4 may be any shape, as long as containing a flow control portion that can reduce a cross-sectional area of the fluid passage.

In one embodiment, the flow control portion is implemented as flow control fingers 41. Referring to FIG. 9A, in one embodiment, the flow control member 4 includes a mounting ring 42, and the mounting ring 42 is formed with a plurality of radially extending flow control fingers 41. The flow control fingers 41 are preferably uniformly distributed in a circumferential direction. Of course, the mounting ring 42 may be an outer ring, and is used to be fixedly installed to an inner surface of the enclosure 91 and the bottom 14 of the treatment chamber 1, the flow control fingers 41 extend radially inwardly from the mounting ring 42. In one embodiment, the mounting ring 42 may also be an inner ring, and the flow control fingers 41 extend radially outwardly from the mounting ring 42.

Figure 6A:
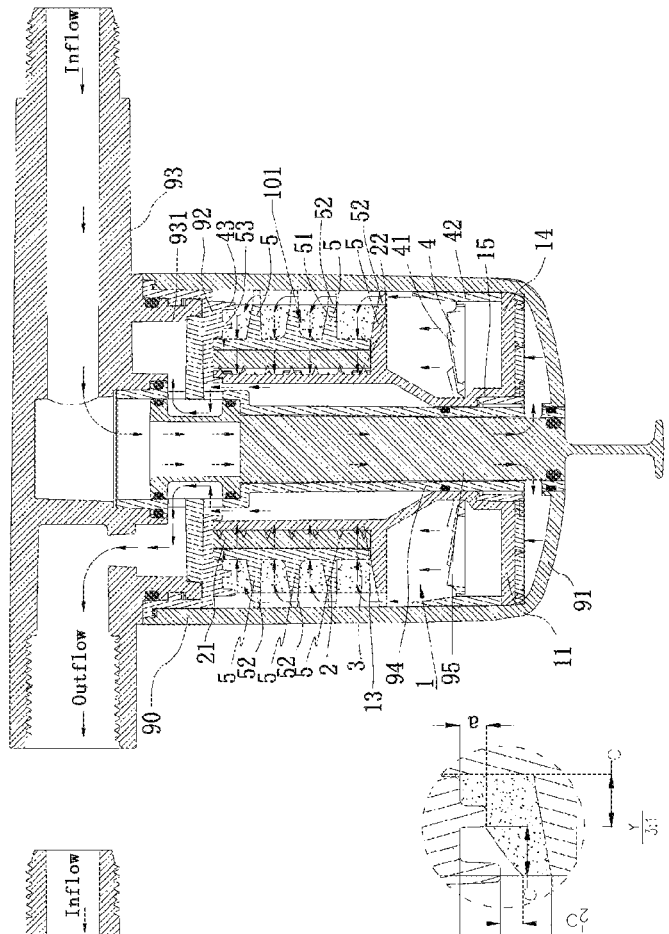
FIGS. 6A-6C are schematic views of respective embodiments of Implementation Ways 3 and 4 of the present invention.

In another embodiment, referring to FIG. 6A, the flow control member 4 is provided on a radial outer side of the upper portion of the barrel-shaped filter 2, or provided above the medium bed layer 101. In this embodiment, the flow control portion of the flow control member 4 is implemented as a flow control flange 43, and the flow control flange 43 extends downward. The flow control flange 43 may be a closed ring, and of course, can be presented as a plurality of intermittent arc-shaped projections. The flow control flange 43 can be formed integrally with the lower surface of the upper cover 92, or separately mounted on the lower surface of the top cover 92, or can also be formed by an inner wall surface of the barrel-shaped filter 2 or the enclosure 91.

In the present Implementation Way, there is no limit on the number of the flow control member 4. In one embodiment, either the flow control member 4 having the flow control fingers 41 or the flow control member 4 having the flow control flange 43 can be selected. Of course, both of them can be simultaneously included.

In a further modified embodiment, referring to FIGS. 5A-5C, one or more bed depth control members 5 are further provided inside the treatment chamber 1. The bed depth control members 5 should be provided at a position which is conducive to building the medium bed layer 101.

In one embodiment, referring to FIGS. 5A-5C, the bed depth control members 5 are provided at an outer side of the barrel-shaped filter 2. For example, by integrally forming the bed depth control members 5 with a predetermined interval in an up and down direction with the holding member 3, the number of components of the fluid treatment apparatus can be reduced. The bed depth control members 5 include bed depth control plates 51. As such, the treatment mediums 100 can be built on an upper surface of the bed depth control plates 51, the weight of the treatment mediums 100 will be borne by the bed depth control plates 51. Thus, the loss of water pressure for suspending and holding the treatment mediums 100 around the barrel-shaped filter 2 is significantly reduced. In one embodiment, there is no need for the bed depth control members 5 to be integrally formed with the holding member 3, separate bed depth control members 5 may be provided on the outer periphery of the barrel-shaped filter 2, respectively, and its setup is more flexible. In one embodiment, the bed depth control members 5 may be absolutely integrally formed with the barrel-shaped filter 2. Obviously, as described in the Implementation Way 1, the bed depth control members 5 may also be integrally formed with or mounted on the permeable wall 13, e.g., the lengths of the bed depth control plates 51 and the annular flange 134 extending radially outwardly in Implementation Ways 1 and 2 may be increased (beyond an outer surface of the barrel-shaped filter 2), to constitute the bed depth control members 5 in the present Implementation Way. In a preferred embodiment, one bed depth control member 5 is provided on the permeable wall 13, and one or more bed depth control members 5 are also provided on the outer side of the barrel-shaped filter 2, a lower end of the barrel-shaped filter 2 may also be located on an upper surface of the bed depth control member 5 formed on the permeable wall 13.

As a further improvement to the foregoing respective Implementation Ways, a plurality of flow control fingers 52 are formed on an outer periphery of the bed depth control plates 51 of respective bed depth control members 5, so as to further improve the fluid velocity.

The working process of the fluid treatment apparatus according to the present Implementation Way will be introduced as follows.

Referring to FIG. 5A, when the fluid has a low flow rate (typically 2 to 4 liters per minute), nearly all the treatment mediums 100 are moved up, and the treatment mediums will uniformly surround the barrel-shaped filter 2, except the top 21 of the barrel-shaped filter 2, to form the medium bed layer 101.

The remaining small quantity of the treatment mediums 100 are violently impacted at the lower portion of the treatment chamber 1 to be moved fast.

Referring to FIG. 5B, there is no medium bed layer 101 formed by the treatment mediums 100 in the part with a length of a in an area to which the arrow X points, at the top 21 of the barrel-shaped filter 2, because the fluid speed is too low, the treatment mediums 100 cannot be lifted to the top portion 21. At the top portion 21, as there is no medium bed layer 101 to surround, the fluid passing through this portion is not subjected to chlorine removal treatment.

At the bottom 22 of the barrel-shaped filter 2, as the bed depth control members 5 are provided, the medium bed layer 101 with the same thickness as an outer diameter of the bed depth control plates 51 of the bed depth control member 5 is also formed at the bottom 22. The fluid passes through the bottom 22 of the barrel-shaped filter 2 with fully removal of chlorine.

The medium bed layer 101 has the same thickness as the outer diameter of the bed depth control plates 51 at the remaining portion of the barrel-shaped filter 2 except the top 21, and the fluid passes through this portion with fully removal of chlorine.

Referring to FIG. 5C, when the fluid has a high flow rate (typically 4 to 10 liters per minute), all the treatment mediums 100 are moved up, and uniformly distributed around the barrel-shaped filter 2.

Herein, no remaining treatment medium is violently impacted to be suspended in the treatment chamber 1.

In the present Implementation Way, through the flow control fingers 41 of the flow control member 4 and the flow control fingers 52 combined with the bed depth control member 5, the cross-sectional area of the fluid passage is reduced, and the fluid velocity is improved. Preferably, the cross-sectional area is reduced by 5% to 50%, and of course, reduction of any percentage of the area can improve the fluid velocity to a certain extent. As the bed depth control plates 51 of the bed depth control member 5 increases the thickness of the medium bed layer 101 at the bottom 22 of the barrel-shaped filter 2, thereby improving the chlorine removal performance of the fluid passing through the bottom 22. Thus, the treatment mediums 100 are uniformly distributed around an external of the barrel-shaped filter 2 except the top 21 of the barrel-shaped filter 2 at a low flow rate, thereby providing excellent chlorine removal performance.

In addition, the treatment mediums 100 can be constructed on an upper surface of the bed depth control plates 51, the weight of treatment mediums 100 will be born by the bed depth control plates 51. Therefore, the loss of water pressure for suspending and holding the treatment mediums 100 around the barrel-shaped filter 2 is significantly reduced.

In the Implementation Way as illustrated in FIGS. 5A-5C, four bed depth control members 5 are provided. However, the number of the bed depth control members may obviously be any other number, which is not limited.

Implementation Way 4

Figure 6B:
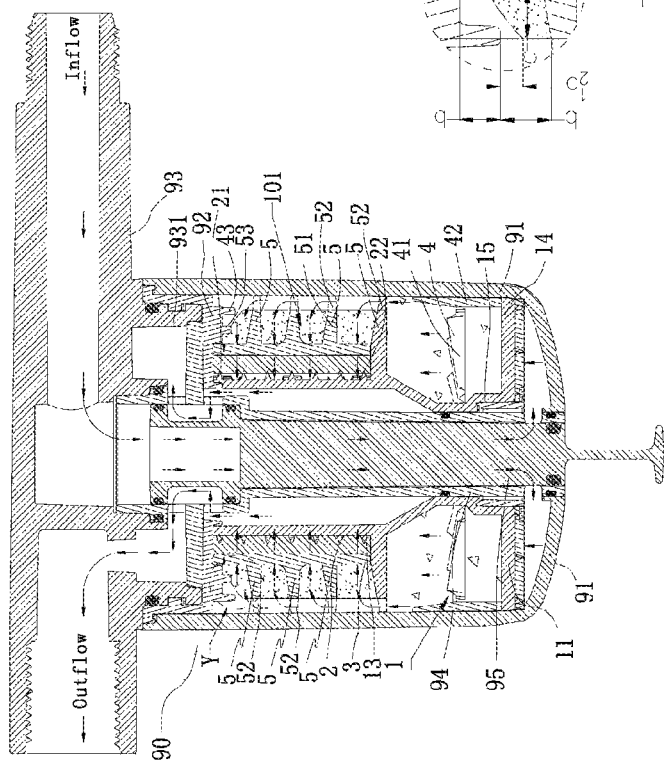
Figure 6C:
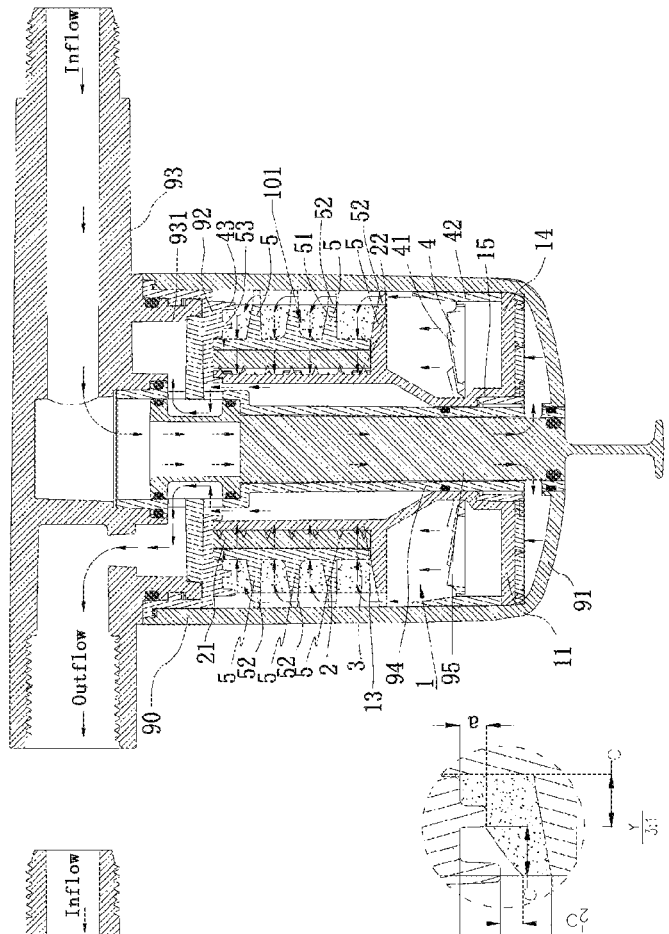

Referring to FIGS. 6A-6C, the structure, the working principle and the effect of the present Implementation Way are basically the same as that of the Implementation Way 3. The further improvements are that on the basis of the Implementation Way 3, various forms of the flow control member 4 and various forms of the bed depth control members 5 are provided inside the treatment chamber 1 at the same time, so as to obtain a maximum flow rate and a minimum pressure loss, thereby providing a fluid treatment apparatus with an ultra-low pressure loss and a high treatment performance.

Referring to FIG. 6A, the fluid treatment apparatus in the present Implementation Way includes:

a flow control member 4 located below the treatment chamber 1, the flow control member 4 having a plurality of flow control fingers 41;

a plurality of bed depth control members 5, each of the bed depth control members 5 having bed depth control plates 51 and flow control fingers 52;

a flow control member 4, including a flow control flange 43, provided above the medium bed layer 101;

a bed depth control member 5, including a bed depth control flange 53, provided above the medium bed layer 101, the bed depth control flange 53 being located at a predetermined distance from a radial inner side of the flow control flange 43, and extending downwards. Preferably, the length of the bed depth control flange 53 extending downwardly is less the length of the flow control flange 43 extending downwardly. Similar to the configuration of the flow control flange 43, the bed depth control flange 53 may be a closed ring, and of course, may also be presented as a plurality of intermittent arc-shaped projections. The bed depth control flange 53 may be integrally formed with a lower surface of the top cover 92, or separately mounted to the lower surface of the top cover 92, or may also be formed by an inner wall surface of the barrel-shaped filter 2 or the enclosure 91.

The working process of the fluid treatment apparatus according to the present Implementation Way will be introduced as follows.

Referring to FIG. 6A, when the fluid has a low flow rate (typically 2 to 4 liters per minute), nearly all the treatment mediums 100 are moved up, and uniformly surround the barrel-shaped filter 2 to form the medium bed layer 101. Referring to FIG. 6B, as illustrated in the enlarged schematic view of a section Y, even at the top 21 of the barrel-shaped filter 2, due to control of the bed depth control flange 53, although the medium bed layer 101 does not reach the same thickness $2c$ as the outer diameter of the bed depth control plates 51 of the bed depth control member 5, at least a half of the thickness c is guaranteed, the treatment performance at the top 21 of the barrel-shaped filter 2 is effectively improved relative to Implementation Ways 1 to 3.

The flow control flange 43 in the outer ring further reduces the cross-sectional area, from an original opening of 1.5 b in FIG. 5B to an opening of 0.5 b in FIG. 6B, thereby further increasing the fluid velocity. Therefore, even at a low flow rate (2-4 liters per minute), enough treatment mediums 100 can be lifted up to the top 21 of the barrel-shaped filter 2 to obtain a thickness of at least c, thereby improving the treatment performance of the top 21.

The medium bed layer 101 has the same thickness $2c$ as the outer diameter of the bed depth control plates 51 at the remaining portion of the barrel-shaped filter 2 except the top 21, and the fluid passes through this portion with fully removal of chlorine.

The remaining small quality of the treatment mediums 100 are violently impacted at the lower portion of the treatment chamber 1 to be moved fast.

Referring to FIG. 6C, when the fluid has a high flow rate (typically 4 to 10 liters per minute), all the treatment mediums 100 are moved up, and uniformly distributed around the barrel-shaped filter 2.

Herein, no remaining treatment medium is violently impacted to be suspended in the treatment chamber 1.

The Implementation Way 4 eventually obtains the fluid treatment apparatus of the present invention with a super-low pressure loss. In the case of 1.5 m water pressure, even being connected after the electric shower, the flow to be treated is also more than the minimum rated flow of 3 liters per minute, the fluid treatment apparatus of the present invention actually achieves the flow of 3.4-3.6 liters per minute.

In addition, it is based on the principle that the fluid will choose the path of least resistance. In the traditional design of making the fluid compact the medium, the fluid continuously flows downward though the filter mediums, in such a case the mediums on an outer periphery of the flow path will either be exhausted or overwhelmed, resulting in a significant reduction in treatment performance. However, in the present invention, up-flow keeps sufficiently mixing with the treatment mediums and ensures a maximum contact time with a fresh treatment mediums, or contact with more treatment mediums, thereby achieving the invention object of the present application.

Implementation Way 5

Figure 7A:
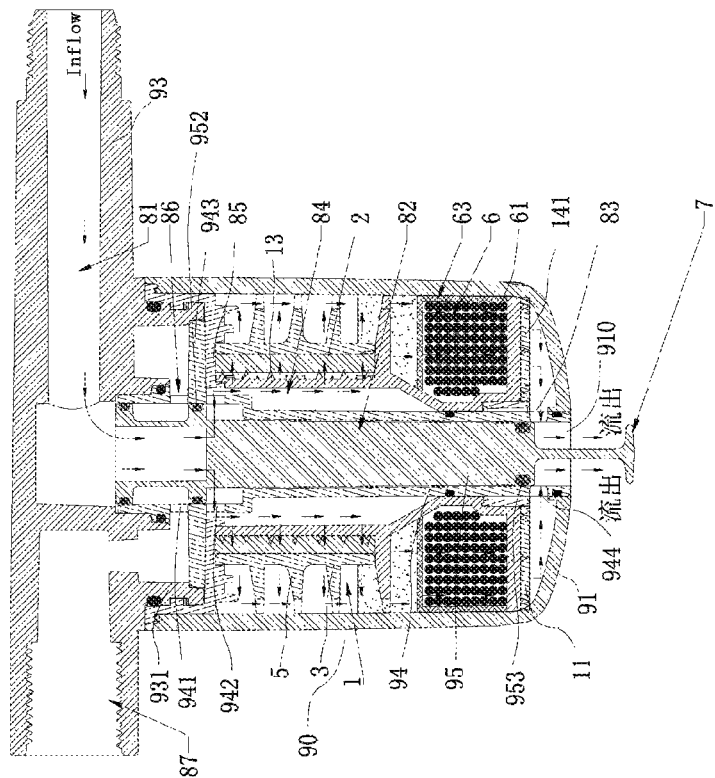
FIGS. 7A-7B are schematic views of respective embodiments of Implementation Ways 5 and 6 of the present invention.
Figure 7B:
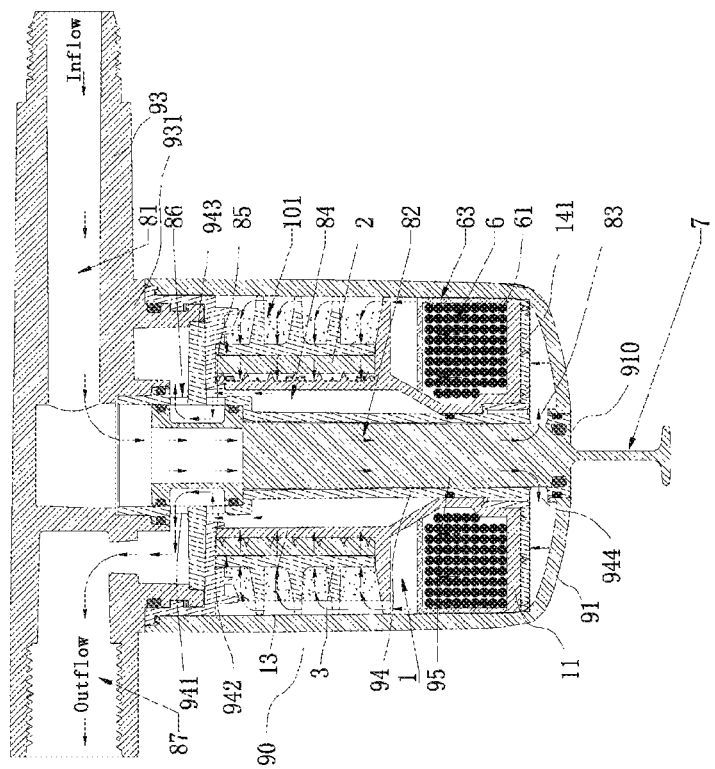
Figure 8B:
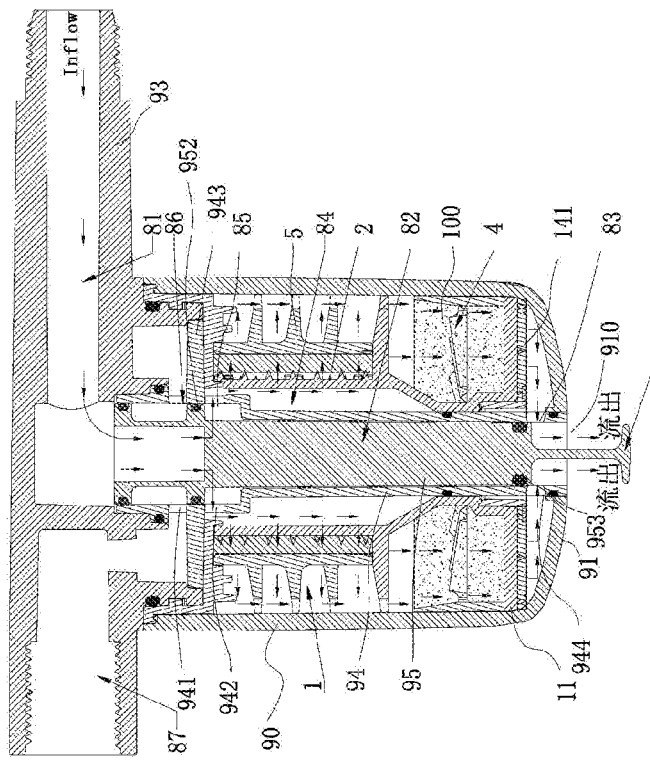
FIGS. 8A-8B are schematic views of embodiments and a backwashing operation of Implementation Way 6 of the present invention.
Figure 8A:
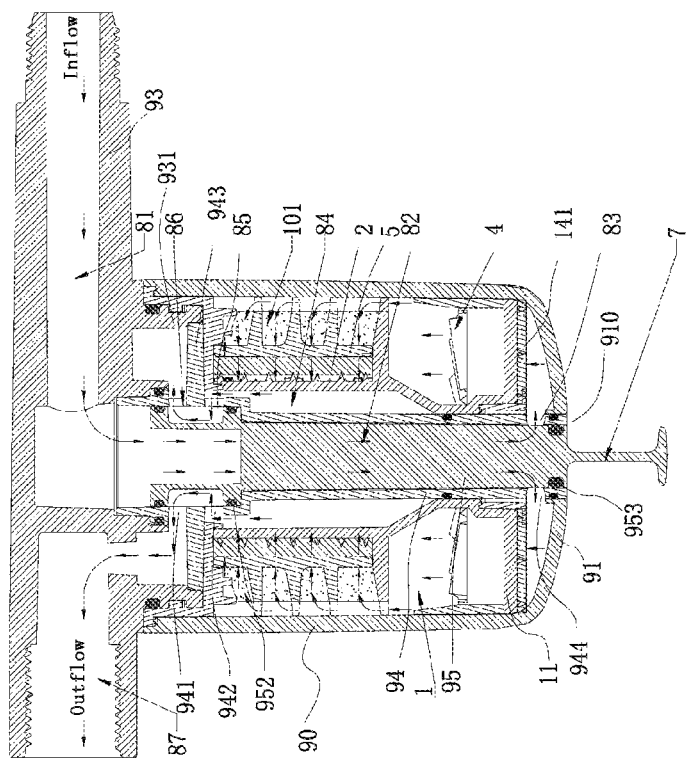

Referring to FIGS. 7A-7B, the present Implementation Way is a further improvement on the foregoing Implementation Ways 1-4. A pre-treatment chamber 6 is further provided on the basis of the above Implementation Ways 1-4, and treatment mediums 61 are accommodated in the pre-treatment chamber 6 to perform a pre-treatment on the fluid. This Implementation Way allows the use of more than one kind of treatment mediums.

The basic operation theory of chlorine removal by KDF is oxidation and reduction reactions which are involved in transfer of free electrons. Thus, the chemical composition of the fluid is an important factor, e.g., an alkalinity formed by $CaCO_3$. At higher alkalinity, e.g., when the concentration is between 100 mg/L to 300 mg/L, the performance of chlorine removal is excellent. However, when the alkalinity is reduced from 100 mg/L to only 10 mg/L (e.g., in the region of Sao Paulo Brazil), the performance of chlorine removal is dropped significantly. Thus, the following two approaches are used to deal with.

1. The granular or spherical calcium sulfite is taken as the pre-treatment medium 61. The alkalinity of the fluid is increased to some extent, and thus the performance of chlorine removal can be improved by 10%-50%.

The Calcium Sulphite is a chemical for removal of chlorine publicly known for several decades. By placing Calcium Sulphite ahead of, i.e., on the upstream side of, the copper and zinc particles, the Calcium Sulphite is dissolved into the water. The chemical property of water is changed due to introduction of a certain amount of dissolved Calcium Sulphite. In other words, although additional alkalinity of less than 0.1 mg/L in a form of Calcium Sulphite is added, the performance of the KDF is increased very effectively, the lower the alkalinity is, the better the improvement is. Thus, the performance of chlorine removal by the copper and zinc particles is increased by at least 50% relative to the situation that the alkalinity produced by CaCO3 is only 10 mg/L. Moreover, the performance of chlorine removal can still be increased by 10% by providing CaCO3 when the alkalinity produced by CaCO3 is over 100 mg/L. For the alkalinity produced by CaCO3 is 10 mg/L (such as in Sao Paulo Brazil), the performance of chlorine removal by the copper and zinc particles is only 50%. By providing granular Calcium Sulphite ahead of same amount of the copper and zinc particles, Calcium Sulphite is able to remove 20% of chlorine, and the copper and zinc particles is able to remove 75% of chlorine, and the totally chlorine removal amount is over 95%. The performance of chlorine removal by providing Calcium Sulphite ahead of the copper and zinc particles is nearly double that by same amount of the copper and zinc particles in the water with a low alkalinity of 10 mg/L (such as in Sao Paulo Brazil).

2. Nanocrystalline polymers (such as NextScaleStop mediums) or ion exchange resin is taken as the pre-treatment medium 61, the number of charges in the fluid can be quickly increased, and thus the performance of chlorine removal is improved by 10%-20%.

NextScaleStop mediums are a kind of specially treated polymer, sized between 0.550 and 0.850 mm (approx. 20×40 mesh), which is able to transform dissolved CaCO3 to a crystalline form. NextScaleStop does not remove any chlorine from the water. However, the surface of the NextScaleStop mediums has double layers of charges. When the water passes through the NextScaleStop mediums, abundant charges are injected into the water for a very short duration ($\frac{1}{1000}$ of a second only). As the basic chlorine removal theory by the copper and zinc particles is oxidation and reduction chemical processes which are involved in transfer of free electrons, when abundant charges are appeared in the water even temporary, the performance of chlorine removal by the copper and zinc particles will be improved by approximate 10 to 20% depending on the alkalinity of CACO3 in the water, the lower the alkalinity is, the better the improvement is.

3. It may also be considered using activated carbon to filter out impurities in the fluid, in order to facilitate improvement of the chlorine removal performance.

In one embodiment, as illustrated in FIGS. 7A and 7B, and FIGS. 9A-9E, by replacing the flow control member 4 with a pre-treatment chamber assembly 63, the pre-treatment chamber 6 can be formed on an upstream side in the treatment chamber 1.

Of course, in another embodiment, the pre-treatment chamber can also be provided on an upstream side of an external of the treatment chamber.

Implementation Way 6

Referring to FIGS. 7A-7B, 8A-8B and 9A-9E, the present Implementation Way is a further improvement on the foregoing Implementation Ways 1-5. On the basis of the above Implementation Ways 1-5, the present Implementation Way further has a backwashing operation function.

In the present Implementation Way, assembly steps of respective constituent members of one embodiment of the fluid treatment apparatus are described in detail.

The sealing rings 951, 952, 953 are placed above the core member 95, and then the core member 95 is slidably inserted into the central sleeve 94. Then, the central sleeve 94 is mounted to a connecting portion 931 of the connecting tube portion 93 by means of, e.g., ultrasonic welding or the like, the connection portion 931 is provided thereon with the sealing ring 932 to constitute a enclosure assembly 96. In which sealing rings 114, 115 and 116 are provided on the central sleeve 94, flow passage openings 941, 942 and a separator 943 are formed on an upper portion of the central sleeve 94, and a flow passage opening 944 is formed on a lower portion of the central sleeve 94.

The flow control member 4 with the flow control fingers 41 are installed in a lower portion of an inner body member 97 constituting the treatment chamber 1, the barrel-shaped filter 2 is disposed on the permeable wall 13 of the inner body member 97, and then the combination 98 constituted by the bed depth control plates and the like is mounted on the inner body member 97, the pre-filter 141 is mounted on the bottom of the inner body member 97 by the retaining ring 142, and then the semi-assembly is placed in the enclosure 91, and the top cover 92 is enclosed in the enclosure 91 by means of ultrasonic welding, etc., and then an apparatus body 90 (a filter cartridge) is formed. The apparatus body 90 may be engaged with the enclosure assembly 96 by means of ultrasonic welding, etc., thereby constituting a relatively complete fluid treatment apparatus.

In the present Implementation Way, the fluid treatment apparatus includes the enclosure 91, a backwash discharge port 910 is provided on the enclosure 91, the central sleeve 94 is provided on a radial inner side of the treatment chamber 1, a core member 95 is provided in the central sleeve 94, a portion of the core member 95 that passes through the backwash discharge port 910 and protrudes outside of the enclosure 91 forms an operating portion 7, the core member 95 can act between a working position and a backwash position, and at the working position, the backwash discharge port 910 is closed and at the backwash position, the backwash discharge port 910 is opened.

In one embodiment, the operating portion 7 is a push and pull handle protruding from a lower portion of the enclosure, and the core member 95 switches between the working position and the backwash position by sliding up and down within the central sleeve 94, and the switching operation is very simple and fast.

At the working position, i.e., in a working mode, the core member 95 is located at a lower position and closes the backwash discharge port 910, the fluid flows through a first passage 81 in the connecting pipe portion 93, a second passage 82 formed by the core member 95, a third passage 83 constituted by a flow passage opening 944 at a lower end of the central sleeve 94, the pre-filter 141, and (the pre-treatment chamber 6 and) the treatment chamber 1, lifts up the treatment mediums 100, passes through the barrel-shaped filter 2 and a fourth passage 84 defined between an inner side surface of the permeable wall 13 and an outer side surface of the central sleeve 94, a fifth passage 85 defined by the flow passage opening 942 at an upper end of the central sleeve 94, a sixth passage 86 defined by the flow passage opening 941, and a seventh passage 87 within the connecting pipe portion 93, and is supplied to the user, e.g., a shower heater.

At the backwash position, i.e., in a backwash mode, the core member 95 is pushed up to an upper position, the backwash discharge port 910 is opened, the fluid flows through the first passage 81, the second passage 82 and the fifth passage 85, enters the treatment chamber 1 from the permeable wall 13, passes through the barrel-shaped filter 2, washes downwards the treatment mediums 100, passes through (the pre-treatment chamber 6 and) the pre-filter 141 and the third passage 83, and is finally discharged from the backwash discharge port 910. The sealing ring 953 mounted on a lower end of the core member 95 prevents the fluid from directly flowing downwards along the core member 95 in the backwash mode.

In one embodiment, the operating portion 7 may also be implemented as a knob, and in this case, the core member 95 switches between the working position and the backwash position by a turning operation. A person skilled in the art may design a fluid flow path according to this objective, and herein is omitted.

Under the case that the technology is feasible, a person skilled in the art may make any combination on all the technical features in the above respective Implementation Ways so as to form different embodiments. In the present invention, examples are not provided in detail.

The above are merely specific Implementation Ways of the present invention, and cannot be used to limit the implementation scopes of the present invention. Any equivalent variation and modification made according to the contents of the present invention, i.e., anyone else makes the fluid move at least part of the treatment mediums accommodated in the treatment chamber in a direction opposite to the direction in which the treatment mediums tend to move under a non-working state, and maintain the moved treatment mediums to be a medium bed layer, should fall within the protection scope of the present invention.

What is claimed is:

1. A fluid treatment apparatus, comprising:
   an enclosure;
   a top cover disposed in the enclosure;
   a bottom wall having a plurality of inflow openings disposed in the enclosure below the top cover, the bottom wall defining a fluid inlet section;
   a barrel-shaped permeable wall provided in the enclosure between the top cover and the bottom wall, the enclosure together with the top cover and the bottom wall and the barrel-shaped permeable wall defining a treatment chamber, granular treatment mediums being accommodated in the treatment chamber, a fluid outlet section being formed by the permeable wall;
   a barrel-shaped filter provided at a radially outer periphery of the barrel-shaped permeable wall; and
   a holding member provided at an outer periphery of the barrel-shaped filter, the holding member being able to hold the barrel-shaped filter and a medium bed layer, the holding member including bed depth control plates, each bed depth control plate extending radially outwardly from and surrounding a radially outer surface of the barrel-shaped filter, a plurality of flow control fingers distributed radially are formed at a radially outer periphery of the bed depth control plates;
   wherein under a nonworking state, a direction in which the treatment mediums tend to move due to gravity action is a downward direction toward the bottom wall of the treatment chamber, and under a working state, the fluid entering the treatment chamber from the fluid inlet section moves at least part of the treatment mediums upwards, and these moved treatment mediums are maintained to be the medium bed layer adjoined to the barrel-shaped filter, the fluid to sequentially pass through the medium bed layer, the barrel-shaped filter and the permeable wall to flow out from the treatment chamber.

2. The fluid treatment apparatus according to claim 1, further including a flow control member, the flow control member to increase a velocity of the fluid by decreasing a cross-sectional area of a fluid passage located within the treatment chamber.

3. The fluid treatment apparatus according to claim 2, wherein the flow control member is located below the permeable wall.

4. The fluid treatment apparatus according to claim 3, wherein the flow control member includes flow control fingers.

5. The fluid treatment apparatus according to claim 2, wherein the flow control member includes a flow control flange located above the medium bed layer and extending downwardly from the top cover.

6. The fluid treatment apparatus according to claim 5, further including a bed depth control flange, the bed depth control flange being formed above the medium bed layer and extending downwards, the bed depth control flange located at a radial inner side of the flow control flange.

7. The fluid treatment apparatus according to claim 1, wherein the treatment mediums are activated carbon particles, ion exchange resin particles or copper zinc alloy particles.

8. The fluid treatment apparatus according to claim 1, further including a pre-treatment chamber, and the pre-treatment chamber accommodates pre-treatment mediums therein so as to perform a pre-treatment on the fluid.

9. The fluid treatment apparatus according to claim 8, wherein the pre-treatment chamber is located on an upstream side within the treatment chamber.

10. The fluid treatment apparatus according to claim 8, wherein the pre-treatment mediums comprise granular or spherical calcium sulphite, ion exchange resin, nanocrystalline polymer or activated carbon.

11. The fluid treatment apparatus according to claim 8, wherein the pre-treatment chamber is located on an upstream side of an external of the treatment chamber.

12. A fluid treatment apparatus, comprising:

an enclosure;

a top cover disposed in the enclosure;

a bottom wall having a plurality of inflow openings disposed in the enclosure below the top cover, the bottom wall defining a fluid inlet section;

a barrel-shaped permeable wall provided in the enclosure between the top cover and the bottom wall, the enclosure together with the top cover and the bottom wall and the barrel-shaped permeable wall defining a treatment chamber, granular treatment mediums being accommodated in the treatment chamber, a fluid outlet section being formed by the permeable wall, wherein under a nonworking state, a direction in which the treatment mediums tend to move due to gravity action is a downward direction toward the wall bottom of the treatment chamber, and under a working state, the fluid entering the treatment chamber from the fluid inlet section moves at least part of the treatment mediums upwards, and these moved treatment mediums are maintained to be a medium bed layer adjoined to the barrel-shaped permeable wall, the fluid to sequentially pass through the medium bed layer and the permeable wall to flow out from the treatment chamber;

a backwash discharge port on a bottom end of the enclosure of the treatment apparatus;

a central sleeve on a radial inner side of the barrel-shaped permeable wall; and a core member in the central sleeve, a portion of the core member that protrudes outside of the enclosure forms an operating portion, the core member to move between a working position and a backwash position, and at the working position, the backwash discharge port is closed, and at the backwash position, the backwash discharge port is opened.

13. The fluid treatment apparatus according to claim 12, wherein the operating portion is a push and pull handle protruding from the backwash discharge port toward a lower portion of the enclosure, and the core member switches between the working position and the backwash position by sliding up and down within the central sleeve.

14. The fluid treatment apparatus according to claim 13, wherein at the working position, the core member is located at a lower position, and at the backwash position, the core member is pushed up to an upper position.

\* \* \* \* \*